Sept. 29, 1925.
G. ELBERT
SIGNALING DEVICE FOR AUTOMOBILES
Filed Feb. 25, 1924
1,555,193
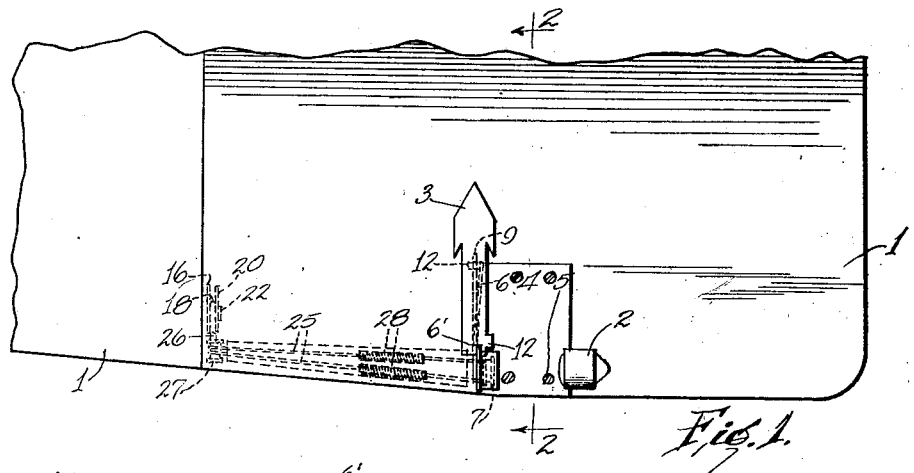
INVENTOR
G. Elbert
BY Munn & Co.
ATTORNEYS Patented Sept. 29, 1925.

1,555,193

UNITED STATES PATENT OFFICE.

GEORGE ELBERT, OF McCOOK, NEBRASKA.

SIGNALING DEVICE FOR AUTOMOBILES.

Application filed February 25, 1924. Serial No. 695,040.

*To all whom it may concern:*

Be it known that I, GEORGE ELBERT, a citizen of the United States, and a resident of McCook, in the county of Redwillow and State of Nebraska, have invented a new and useful Improvement in Signaling Devices for Automobiles, of which the following is a full, clear, and exact description.

My invention relates to improvements in signaling devices for vehicles, such as automobiles and the like, and it consists in the combinations, constructions, and arrangements herein described and claimed.

An object of my invention is to provide a device which may be worked from the interior of the car, as from the instrument board, or other suitable position near to the driver or an occupant of the car, and which will indicate to the driver of an oncoming device the direction in which the vehicle is about to turn, or that it is about to stop or to back, according to the particular position in which the signaling device is set.

A further object of my invention is to provide a signaling device, which is particularly adapted to closed cars, and which is disposed on the top of the car in a position where it may be readily seen.

A further object of my invention is to provide a signaling device consisting of an indicating member and an operating dial disposed within the car, having a handle or pointer which when moved to various positions will cause the operation of the signal member, so that the latter will assume similar positions and thus convey the signals desired.

A further object of my invention is to provide a signaling device, having an indicating member which consists of a relatively thin strip which, when not in use, will lie in a plane parallel with the top of the automobile, thus being inconspicuous, but which may be rotated on its axis to bring it into instant view.

Other objects and advantages will appear in the following specification, and the novel features of the invention will be particularly pointed out in the appended claims.

My invention is illustrated in the accompanying drawings, forming part of this application, in which Figure 1 is a plan view of a portion of an automobile top, showing the position of my improved signaling device, Figure 2 is an enlarged section along the line 2—2 of Figure 1, looking in the direction of the arrows, Figure 3 is a section along the line 3—3 of Figure 2, Figure 4 is a perspective view showing a portion of the signal operating mechanism, and Figure 5 is a sectional view along the line 5—5 of Figure 1.

In carrying out my invention, I make use preferably of the top 1 of an automobile as a supporting means for the signaling device. In Figure 1, I have shown the relative position of a lamp 2 and an indicating member 3, which, in the present instance, is made in the form of an arrow, but which obviously might be any other suitable indicating member, such as a hand. These members are disposed on the top 1 and preferably near the left hand edge.

It will be seen from Figure 2 that I have provided a plate 4 which is secured to the top 1 in any suitable manner, as by screws 5. One end of this plate is bent up to form an integral flange 6, which constitutes a support for a grooved wheel or roller 7, which is rigidly mounted on a shaft 8. This shaft projects through the extension 6' of the flange 6, and has rigidly mounted on its opposite end a round rod or wire 9 which projects at right angles from the shaft.

The indicating element 3 consists preferably of a flat piece of metal made in the form of an arrow, one end being bent at right angles to constitute a flange 10 projecting from one side of the indicating element. A bearing 11 is carried by the same side of the indicating element. The wire or rod 9 projects through the flange 10 and the bearing 11, so that the indicating element will rotate around the rod, thus virtually giving the indicating element a rotation around its own axis, since the rod is immediately adjacent to one side of the flat metal element. The indicating element 3, being carried on the wire 9, which is rigidly attached to the shaft 8, will be swung in a semi-circle, when the pulley 7 is rotated in the manner hereinafter explained. It will be observed that the inner end of the indicating member 3 is provided with a curved or bent tongue 12, which is arranged to engage a cam portion 13 of the flange 6. When the indicating member is approaching the flange, the tongue 12 is engaging the cam 13 so as to rotate the indicating element 3 on its axis into a position at right angles to that which it will assume when the pulley 7 is turning it in another position. In order to permit the indicating element to assume this position, I have provided a recess 14. This permits the indicating element to assume a position at right angles to the flange 6, so that it will rest on the top of the flange, while the bent portion 15 will permit the end of the wire 9 to lie snugly alongside the flange 6.

In order to manipulate the indicating member, I have provided the means shown in Figures 2 and 3. In these figures, it will be observed that I have provided a plate 16 which may be secured to the instrument board 17, and which bears a pulley 18. The shaft 19 of this pulley extends through a dial 20, which is provided with five notches or recesses A, B, C, D and E. The dial is spaced from the plate 16 by means of posts and sleeves 21. The shaft 19 has rigidly secured to it a handle 22 provided with a knob 23 for manipulating the handle. On the inner side of the handle is a U-shaped stop member 24, which straddles the dial 20 and which is forced by the spring tension of the handle 22 normally against the dial, so that as the handle is moved around, the outer face of the U-shaped member 24 will enter the recesses to hold the handle in any position to which it has been moved. Pressure on the handle, however, is sufficient to force it out of one recess and move it to the next.

Wound around the pulley 18 is a cord 25 which passes through a guide pipe or conduit 26 to a roller 27, and thence rearwardly just underneath the top 1 to springs 28, thence around a roller 29, where it passes through the top 1 (see Figure 2) and is wound around the roller 7.

Cooperating with the handle 22 is a switch mechanism as shown in Figure 2. This consists of an arm 30 which is pivotally mounted at 31 and whose rear end has a cam surface 32 which engages a movable cross bar 33, which is normally held by a spring 34 in a forward position.

It will be seen from Figure 2 that when the arm 30 is swung into the full line position, its rear end will engage the cross bar 33 to force it against the tension of the spring 34 against a spring contact 35 which bridges the conductors 36 and 37. The latter are connected to a source of current (not shown), and form part of the lighting circuit of the lamp 2. In the first position shown in Figure 2, i. e., in the position A, the U-shaped member 24 enters a slot 38 in the member 30, thus permitting the cross bar 33 to assume its dotted line position and breaking the circuit through the conductors 36 and 37.

From the foregoing description of the various parts of the device, the operation thereof may be readily understood. When the handle 22 is in the position A, the lamp circuit is broken, as stated, and the indicating member 3, in this case the arrow, is in the lower dotted line position, as shown in Figure 2, substantially parallel with the top 1 of the vehicle. The arrow is inconspicuous, so that the vehicle when proceeding will not display any signal. If it is desired to turn to the right, all that the operator does is to grasp the knob 23 and swing the handle from the position A to the position B. This will cause the rotation of the pulleys or wheels 18 and 7 through the medium of the cord 25. At the first upward movement of the arrow, it will be engaged by the point 39 of the extension 6', which will tend to tilt the arrow into a plane parallel with the extension 6'. Since the arrow is immediately adjacent to its extension 6', it will thereafter travel in a plane parallel to the extension, or at right angles to the position shown in Figure 1. To the occupant of the vehicle approaching from the rear, the arrow will point in the right hand direction, and will indicate that a turn is to be made to the right. In making this movement from position A to position B on the dial, the arm 30 will be swung up into the full line position, and this will close the switch and cause the lamp to light up.

It may be that instead of turning to the right, the driver wishes to stop, in which case the arm 22 is swung to position C, when the arrow is standing in an upright position, such as that shown in Figure 2, the signal lamp 2 being lighted at the same time to indicate the movement. The signal lamp 2 not only flashes to the rear preferably a red signal, but throws a white light on its opposite side on the arrow, which is illuminated.

Should the driver desire to turn to the left, he moves the handle to the position D, and the arrow will take a corresponding position. The fifth position is shown, which indicates that the driver intends to turn around a traffic post at an intersection, or that he intends to back out after he is parking.

When the vehicle is under way again, the driver will swing the handle back to the original position, and as it passes the arm 31 it will engage in the slot 38 and move it into the dotted line position shown in Figure 2, thereby permitting the switch to open and thus putting out the signal lamp.

The springs 28 which are fastened to the cord 29 keep the cord at the right tension. They also serve to take up the jar when operating the cord to move the arrow, and to hold the arrow down, so that it will not rattle when it is in its lower position.

While the device is primarily designed for closed cars, it can be used with touring cars, since the rollers 27 and 29, as well as the indicating element and lamp, may be mounted in any suitable manner on the top. Of course, when the top is folded back, the parts will have to be disconnected, but any suitable arrangement may be used to hold these parts in place.

I claim:

1. The combination with a vehicle having a top, of an indicating element mounted for revolution substantially about its own axis, and having a position normally in a plane parallel with the top of the vehicle, means for swinging the indicating element in an arc of a plane perpendicular to the plane of the top, and means for causing the rotation of the indicating element into a plane at right angles to the plane of its normal position.

2. A signaling device comprising an indicating element of relatively thin flat material, a bracket, a shaft journaled in said bracket, a rod extending laterally from said shaft, said indicating element being rotatably mounted on said rod, the central axis of the indicating element being parallel with and contiguous to the rod, and means for engaging the indicating element to rotate it into a plane parallel with the axis of the shaft.

3. A signaling device comprising an indicating element of relatively thin flat material, a bracket, a shaft journaled in said bracket, a rod extending laterally from said shaft, said indicating element being rotatably mounted on said rod, the central axis of the indicating element being parallel with and contiguous to the rod, means for engaging the indicating element to rotate it into a plane parallel with the axis of the shaft, and means carried by the bracket and arranged to engage the indicating element to rotate it into a plane at right angles to the axis of the shaft, when the shaft is rotated in the opposite direction.

4. The combination with a vehicle having a top, of an indicating element mounted for revolution substantially about its own axis, and having a position normally in a plane parallel with the top of the vehicle, means for initially rotating the indicating element about its axis into a plane at right angles to the plane of the top, and means for swinging the indicating element in an arc of said perpendicular plane to predetermined positions.

5. The combination with a vehicle having a top, of an indicating element, means for moving said indicating element to predetermined positions in a plane perpendicular to the plane of the top, and means for automatically turning said indicating element into a plane parallel with the plane of the top at the end of its movement toward the top.

GEORGE ELBERT.